3,649,659
Patented Mar. 14, 1972

3,649,659
COORDINATED COMPLEXES OF MANNICH BASES
Ferdinand P. Otto, Woodbury, and Andreas Logothetis, Haddonfield, N.J., assignors to Mobil Oil Corporation
No Drawing. Continuation-in-part of application Ser. No. 582,253, Oct. 10, 1966. This application Mar. 24, 1970, Ser. No. 22,366
Int. Cl. C07f 3/06, 7/22, 15/04
U.S. Cl. 260—429 R
11 Claims

ABSTRACT OF THE DISCLOSURE

Metal complexes exhibiting detergency and neutralizing properties in organic fluids are prepared by reacting a Mannich product with a metal salt of an acid. Exemplary of the Mannich products used are those prepared from amines, polyalkylphenols and aldehydes.

CROSS REFERENCE TO RELATED APPLICATIONS

This application is a continuation-in-part of copending U.S. application Ser. No. 585,253, filed Oct. 10, 1966, now abandoned.

BACKGROUND OF THE INVENTION

Field of the invention

This invention relates to stabilized organic compositions containing novel additives and in particular this invention relates to organic compositions containing metal complexes.

Discussion of the prior art

It is kown that in the normal use of organic industrial fluids, such as lubricating oils, transmission fluids, bearing lubricants, power transmitting fluids and the like, the base medium is subjected to oxidizing conditions which may result in the formation of sludge, lacquers, corrosive acids, and the like. These products are undesirable in the equipment in which the industrial fluid is used. The oxidation residues or heavy contaminants may interfere with the normal operation of the fluid, increase its viscosity, and even cause severe damage to the parts of the equipment themselves.

In the lubrication of modern engines, particularly, oil compositions must be able to prevent acids, sludge and other solid contaminants from remaining near the moving metal parts. Poor piston travel and excessive engine bearing corrosion may result, unless the oil can prevent the sludge and oxidation products from depositing in the engine. Bearing corrosion is another serious problem in gasoline engines which operate at an oil temperature of about 300° F. or higher.

The most desirable way of decreasing these difficulties is to add to the base organic fluid a detergent or dispersant additive capable of dispersing the solid particles to prevent them from interfering with the normal operation of the equipment, and leaving the metal surfaces relatively clean. Today, with modern equipment operating under increasingly strenuous conditions, it is desirable to develop new detergents which have improved dispersant properties, which are soluble in the fluid medium to which they are added, and which are themselves stable therein.

SUMMARY OF THE INVENTION

The invention provides a metal coordinated complex product obtained by reacting a basic organic nitrogen compound with an aldehyde and a polyalkylphenol and subsequently reacting the product thus formed with a metal-containing coordinating agent prepared from a metal selected from the group consisting of Groups I-B, II-B, IV-A, VI-B and VIII of the Periodic Table and an acid.

The invention also provides compositions comprising a major proportion of an organic fluid and a minor amount of the above compounds sufficient to impart detergency properties thereto. When used in accordance herewith, such compounds may be present in the organic fluid to the extent of from about 0.05 to about 25% by weight thereof.

DESCRIPTION OF SPECIFIC EMBODIMENTS

The preferred metal-containing reagents may be prepared as metal salts of the following acids:

(1) carboxylic acids,

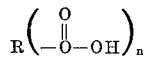

(2) sulfonic acids, HR—SO$_3$
(3) phosphoric acids, HR$_2$PO$_4$ or H$_2$RPO$_4$
(4) phosphinic or phosphonic acids,

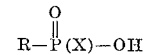

[X may be R, hydrogen, or hydroxy]
(5) sulfamic acid, HO—SO$_2$—NH$_2$ and
(6) sulfuric acid, H$_2$SO$_4$ wherein R is an alkyl, aryl, aralkyl or alkaryl radical having up to about 50 carbon atoms, oxygen-, sulfur-, and nitrogen-containing derivatives thereof, and $n$ is 1 or 2. Although acids (5) and (6) are inorganic, nevertheless, they share with the other acids the ability to form the stable and useful metal complexes of this invention.

The reaction between the Mannich product and the metal salt is conducted at a temperature ranging from about 60° to about 250° C. under atmospheric or reduced pressure conditions. Generally the mole ratio is from about 0.5 to about 2 moles of metal reagent per mole of nitrogen compound.

As indicated previously, the metal-containing coordination complex reagent includes metal salts of carboxylic acids, organosulfonic acids, organic phosphorus-containing acids, sulfuric acids, or sulfamic acids. The organic portion of the first three groups is ordinarily a hydrocarbyl substituent having from 1 to about 50 carbon atoms, and more preferably from 1 to about 30 carbon atoms. The polyvalent metal salts of these acids, especially the divalent metals, provide suitable reagents for the products of this invention. The metal is preferably selected from Groups I-B, II-B, IV-A, VI-B, and VIII of the Periodic Table; the acceptable metals include zinc, tin, nickel, copper, cobalt, cadmium, chromium and lead. Of these the most preferred are zinc, tin and nickel.

Of the monocarboxylate salts, such salts as formate, acetate, propionate, butyrate, valerate, stearate, oleate, benzoate, salicylate and the like may be used. The dicarboxylate salts include the succinates and the alkenyl succinates, where the alkenyl portion contains from 2 to about 300 carbon atoms. The organophosphorus salts include metal salts of alkyl, aryl and alkaryl phosphoric acids, such as butyl phosphate, octyl phosphate, phenyl phosphate, methylphenyl phosphate, diamylphenyl phosphate, phosphosulfurized olefins and polyolefins, wherein the olefins and polyolefins may contain up to 300 carbon atoms, and the like, as well as the corresponding phosphinates and phosphonates. Organic phosphates containing two or more phosphorus atoms may also be used. Of the organo sulfonates may be used such aryl sulfonates as mineral oil derived sulfonates, phenylsulfonate, naphthylsulfonate, tolylsulfonate, wax-benzene sulfonate, including mono- and multi-alkyl-substituted derivatives of such arylsulfonates, and the like. The preparation of these organic phosphates, phosphinates, phosphonates and sulfonates is well known in the art.

When a polyamine, as defined herein, is reacted with an alkenylsuccinic acid or anhydride, the product will contain the group

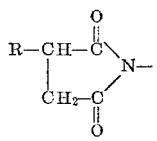

where R may have from 2 to about 300 carbon atoms. The ring may be opened by reaction in the presence of a metal compound to form the salt of a monoamide derivative

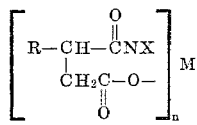

where M is the metal, X is the remainder of the succinimide molecule and $n$ is the valence of the metal. This salt may also be used as the metal complexing agent.

The nitrogen compound must contain a free primary or secondary amino group. Among the nitrogen compounds contemplated are the alkylene polyamines of the structure $H_2N(RNH)_zH$, wherein R is alkylene of from 2 to 5 carbon atoms and $z$ is from 1 to about 10. Typical of the amines coming within this structure are ethylene diamine, propylenediamine, triethylene tetramine, tetraethylene pentamine, di(methylethylene) triamine, hexapropylene heptamine, decaethylene undecamine, and the like.

Also useful as the nitrogen compound is the condensation product of any of the above polyamines with a monocarboxylic acid or anhydride having from about 1 to about 40 carbon atoms. These include formic, acetic, propionic, valeric, decanoic, stearic, oleic, eicosoic acids and the like. Also included are dicarboxylic acids and anhydrides such as alkenyl succinimic acids where "alkenyl" has from 2 to about 300 carbon atoms.

Further included as amines are arylenediamines, such as phenylenediamine, naphthalenediamine, and the like, and other heterocyclic amines such as piperazine.

The useful aldehydes include any of those containing from 1 to about 30 carbon atoms, exemplified by aliphatic members such as formaldehyde, paraformaldehyde, acetaldehyde, butyraldehyde, aldol, decyl aldehyde, stearyl aldehyde, eicosyl aldehyde, the aromatic members such as benzaldehyde and the heterocyclic members such as furfural.

The polyalkylphenol contemplated is of a high molecular weight, i.e., from about 500 to about 4000. These may be prepared in general by alkylating phenol with a polyalkylene in the presence of an alkylation catalyst, such as boron trifluoride-containing catalyst or aluminum chloride. A more detailed description of an alkylation method can be found in U.S. Pat. No. 3,368,972.

Representative of the high molecular weight alkyl-substituted phenols are polypropylphenol, polybutylphenol, polyamylphenol and the like. In place of phenol, high molecular weight alkyl-substituted compounds of resorcinol, hydroquinone, catechol, cresol, xylenol, amyl phenol, hydroxydiphenyl, benzylphenol, phenylethylphenol, phenol resins, methylhydroxydiphenyl, guiacol, alpha and beta naphthol, alpha and beta methylnaphthol, tolylnaphthol, xylylnaphthol, benzylnaphthol, anthrol, phenylmethylnaphthol, phenoxyphenol, chlorophenol, and the like may be used.

In preparing the Mannich products from, for example, an amine such as tetraethylene pentamine, an aldehyde such as formaldehyde and a polyalkylphenol such as polypropylphenol, it is preferred that the respective molar ratio of reactants be about 0.1–10:0.1–10:1.

These basic nitrogen compounds are reacted with the metal salt to yield what is believed to be a complex of the metal salt and the basic organic compound. A salt-forming reaction does not occur since there is no evidence of the anion of the metal salt producing a separate by-product. Moreover, the resulting reaction mixture upon analysis appears to be a single molecule, similar to those existing in the coordinated complexes of the Werner-type. For the purpose of this invention, therefore, the product compounds are referred to herein as coordinated complexes.

The base fluids for which the compounds of this invention find utility include gasoline, petroleum products of both lubricating and fuel viscosities, and synthetic fluids. In the latter class may be included synthetic ester lubricants, such as those formed from monohydric alcohols and dicarboxylic acids, glycols or glycerols with monocarboxylic acids, and pentaerythritols with carboxylic acids, including alcohols having from about 4 to about 20 carbon atoms, and carboxylic acids having from 2 to about 18 carbon atoms. Many synthetic esters may have mixed alcohols or carboxylic acids. Commonly may be included 2-ethylhexyl sebacate, trimethylolpropane trioctanoate, and especially pentaerythritol esters of valeric acid, isovaleric acid, caproic acid, caprylic acid, pelargonic acid, capric acid, and the like. Of special interest is a mixed pentaerythritol ester of an aquimolar proportion of commercial valeric acid (containing isovaleric acid) and pelargonic acid. Other synthetic fluids include liquid polyolefins, alkylene oxide fluids, silicone fluids, polyacetals, and simple hydrocarbons of stable fluid viscosities.

In one aspect of this invention, it has been discovered that lubricant compositions containing these complexes possess greater thermal stability, and result in more effective dispersancy in high-output-high-temperature engines than with uncomplexed nitrogen compounds, and yet the compositions retain excellent low temperature detergent qualities.

The following examples illustrate this invention more clearly. All parts and percentages are on a weight basis unless otherwise specified.

EXAMPLE 1

Into a 12-liter, 4-neck flask equipped with a mechanical stirrer, thermometer, reflux condenser and a water take-off tube, were added 6000 parts of a polypropylphenol, having a molecular weight of 900 and an active hydrogen number of 0.86, and 396 parts of diethylenetriamine. To this reaction mixture was added over a period of one hour, 150 parts of paraformaldehyde. The reaction mixture was maintained at 110° C. during this addition and held at that temperature for a total of 8 hours. The water by-product was stripped off with the aid of nitrogen gas at a temperature of about 160° C. About 86 cc. of water (theory 90 cc.) was removed in the take-off tube. The resulting mixture was stripped at 5–10 mm. Hg vacuum for 3 hours up to 180° C. About 200 cc. of unreacted amine and polypropylene light ends were recovered. The product, a clear, brown, viscous oil, had the following analysis:

Nitrogen=1.50%

EXAMPLE 2

To 2000 grams of the product of Example 1 was added 470.4 grams of zinc acetate in 100 grams of distilled water. Reflux was maintained for 3 hours. The product was stripped to 160° C. The resulting product, diluted in 23% process oil and filtered, had the following analysis:

Nitrogen=0.97%
Zinc=3.06%

EXAMPLE 3

Fifteen hundred parts of polypropylphenol (made from phenol and polypropylene of 825 molecular weight), 462 parts of a product prepared by reacting dodecenylsuccinic anhydride and diethylenetriamine in a 1:1 molar ratio and 660 parts of process oil (Promar #5) were placed in a reaction vessel. 54 parts of paraformaldehyde were added thereto over a period of 2 hours at 70° C., with stirring. Upon completion of the reaction, the mixture was stripped for 2 hours at 150° C. under a vacuum of 5 mm. of Hg. A clear, dark brown product was obtained having a nitrogen content of 1.88% (calculated (percent) N 1.85).

EXAMPLE 4

Alkyl ($C_{15-20}$) benzene sulfonic acid, 5120 parts, was degassed at room temperature for 2 hours by purging with nitrogen. 600 cc. of distilled water was added thereto, followed by the addition to the solution of 300 parts of zinc oxide over a period of one hour at 50° C. The alkylbenzene is a mixture of 60% monoalkylbenzene and 40% dialkylbenzene derived from a mixture of $C_{15}$-$C_{20}$ olefins. 1540 parts of process oil (Promar #5) was then added, and the water was stripped off at about 110° C. while bubbling in nitrogen. A defoamant was added and a vacuum of 5–10 mm. of Hg was applied for 1½ hours at 150° C. 580 cc. of water was removed. 210 parts of filter aid (Hyflo clay) was added to the reaction mixture, and the mixture was filtered through a heated Buchner funnel. The product had the following analyses:

Calculated (percent): Zinc, 3.60; sulfur, 3.60. Found (percent): Zinc, 347; sulfur, 3.49.

EXAMPLE 5

Fifteen hundred parts of the product of Example 3, 700 parts of the product of Example 4 and 50 cc. of water were mixed and the mixture was refluxed for one hour at 100–105° C. The water was removed by bubbling in nitrogen gas for 1½ hours at 130–150° C. This was followed by stripping for 3 hours at 5 mm. of Hg. A clear, dark brown viscous product was obtained containing 33% oil. It had the following analyses:

Calculated (percent): Nitrogen, 1.30; zinc, 1.10; sulfur, 1.10. Found (percent): Nitrogen, 1.29; zinc, 1.20; sulfur, 1.06.

EXAMPLE 6

Two thousand parts of polypropylphenol (made from phenol and polypropylene of 825 molecular weight), 925 parts of diethylenetriamine and 717 parts of process oil (Promar #5) were charged to a flask, and 90 parts of paraformaldehyde was added to the mixture over 1½ hours at 80° C. This mixture was refluxed for 1½ hours at about 100–105° C. The water was removed by purging with nitrogen for 30 minutes up to 150° C., and then a vacuum of 5 mm. of Hg was applied for 2 hours at 150° C.

Calculated (percent): nitrogen, 1.30. Found (percent): nitrogen, 1.27.

EXAMPLE 7

Two thousand parts of the Example 6 product, 650 parts of the Example 4 product and 100 parts of distilled water were mixed and heated for 2½ hours at 100–146° C., during which time water was removed. This was followed by heating at 150° C. for 2 hours under 4 mm. of Hg. The final product, containing about 31.2% oil, had the following analyses:

Calculated (percent): nitrogen, 1.00; zinc, 0.86. Found (percent): nitrogen, 0.96; zinc, 0.85.

EXAMPLE 8

Twenty-six hundred parts of polypropyl (molecular weight 825) phenol was charged to a flask and was heated to 100° C. 94 parts of $P_2O_5$ was added at this temperature over a period of 2 hours and the mixture was heated for 4 hours at 130° C. The product, believed to be predominantly a mixture of mono- and di-polypropylphenyl acid phosphates

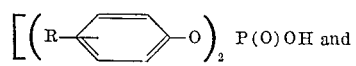 P(O)OH and

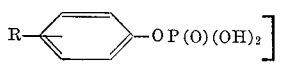

was filtered through Hyflo clay. It contained 1.45% of phosphorus (calculated 1.50%) and had a total acid number of 35.4 mg. KOH/gm.

EXAMPLE 9

The zinc salt of the product of Example 8 was prepared by adding 110 parts of zinc carbonate at 80° C. over ¾ hour to a mixture of 2500 parts of the Example 8 product and 867 parts of Promar #5 process oil. This mixture was heated for 3 hours at 150° C. while bubbling in nitrogen to remove water. Following this, the mixture was stripped for 2 hours at 150° C. and 5–10 mm. of Hg. Solids were removed by filtering through a heated Buchner funnel.

Calculated (percent): phosphorus, 1.00; zinc, 1.50. Found (percent): phosphorus, 1.00; zinc, 1.30.

EXAMPLE 10

Seventeen hundred parts of the product of Example 6, 1500 parts of the product of Example 9 and 100 cc. of distilled water were mixed and the mixture was heated to 150° C. and maintained at this temperature for 2 hours while bubbling in nitrogen to remove the water. Then vacuum (5 mm. of Hg) was applied for 2½ hours at 150° C. The final product, a dark brown, clear, viscous liquid had the following analyses:

Calculated (percent): nitrogen, .69; zinc, .60; phosphorus, .47. Found (percent): nitrogen, .67; zinc, .61; phosphorus, .47.

EVALUATION OF PRODUCT

The metal coordinated complex products of this invention have been tested in a series of tests designated to indicate the utility of these products in lubricating oils and fuels.

(1) THE SULFURIC ACID NEUTRALIZATION TEST

This test measures the ability of an oil additive to neutralize strong acids formed in the engine operating on sulfur containing fuels. Sulfuric acid is mixed with a heated blend of the additive and the oil in iso-octane. The solution is centrifuged to separate out insoluble material. The optical density of the clear solution is measured. From this value, the optical density of a blend of the additive applied to a corresponding amount with iso-octane is subtracted; the difference gives the optical density of dispersed sulfuric reaction products. The optical density of an acetone extraction of the iso-octane-oil solution is then determined. The average optical density of the iso-octane-oil solution is expressed as the optical density of the dispersed sulfuric acid reaction product. The average optical density of the acetone solution is expressed as the optical density of the non-dispersed sulfuric reaction products. The total of these values or either one alone is used in the evaluation of detergent additives. The lower the value of this test, the better the detergent.

(2) PYRUVIC ACID DISPERSION TEST

This test measures the dispersant value of an oil additive an indicates the detergent properties when used in lubricating engines operating on low sulfur compound fuels. The values of this test are taken with those of the sulfuric acid test to predict the performance of these additives. Pyruvic acid is mixed with a heated blend of the additive and oil. The mixture is diluted with benzene and centrifuged to separate the insoluble materials. The insolubles are dissolved in acetone. The optical density of the oil-benzene solution gives the total amount of color. From this value, the optical density of the initial additive blend diluted with benzene to a corresponding amount is subtracted. This corrected value is expressed as the optical density of the dispersed pyruvic acid polymer. The optical density of the acetone solution is expressed as the optical density of the non-dispersed pyruvic acid polymer. The higher the percentage of the pyruvic acid results, the better the additive.

The blends of oil tested in these two tests are produced from a solvent refined lubricating oil of S.A.E. 30 grade containing 3% active ingredient of the additive and 1% of zinc dihexylphosphorodithioate. Each blend was tested in the two tests. The results are shown in Table I below:

TABLE I

| Solution | Pyruvic acid, percent | Sulfuric acid |
|---|---|---|
| Blank (oil+1% zinc dihexyl-phosphorodithioate) | 58.6 | 0.102 |
| Blank plus product of Example: | | |
| 2 | 99.3 | 0.001 |
| 5 | 85.1 | 0.002 |
| 6 | 99.5 | 0.002 |
| 7 | 78.8 | 0.002 |
| 10 | 61.1 | 0.002 |

(3) 1-H CATERPILLAR ENGINE TEST

The test is performed to evaluate detergency characteristics of a sample oil by rating the quantity of sludge and lacquer deposits in a single cylinder diesel engine operating up to 480 hours. The engine is operated under a steady load and is stopped periodically for oil changes. The fuel used contains 70% of a coastal gas oil, 20% of a Kuwait 650° F. gas oil and 10% of kerosene. The lubricating oil is a straight grade solvent S.A.E. 30 refined oil containing 3.3% of an overbased calcium sulfonate, 1.6% of a barium salt of phosphosulfurized polybutene and 1.14% of zinc o-isopropyl-o-ethylhexyl phosphorodithioate.

The engine is operated under the following conditions:

Speed, r.p.m. ---------------------------- 1800±10
Intake air temp., ° F. ---------------------- 170±5
Coolant out temp., ° F. -------------------- 160±5
Oil pressure, p.s.i. ------------------------ 30±1

At the end of the test, the engine is dismantled and various parts thereof, such as the pistons and rings, are inspected for dirt, sludge and lacquer deposits. The following results using 2.1% by weight of the additive were obtained.

TABLE II

| Additive | Hours | Piston | Lacquer demerits | Top groove packing, percent |
|---|---|---|---|---|
| Example 5 | 120 | 99.5 | 0 | 0 |
|  | 240 | 97.8 | 1 | 1 |
|  | 480 | 94.7 | 3.7 | 2 |
| Example 7 | 120 | 99.8 | 0.0 | 1 |
|  | 240 | 99.3 | 0.2 | 2 |
|  | 480 | 97.4 | 1.5 | 1 |

It is further contemplated that these additives will be useful in fuels in preventing deposits.

As is well known, fuel oils, particularly distillate fuel oils, such as those used as domestic heating oils and diesel fuels, have a tendency to deteriorate in storage and to form sludge. Also, by the time the fuel oil reaches the consumer, it contains small amounts of foreign substances, such as condensed moisture and particles of rust and dirt, which become entrained in the oil from the tanks and pipes of the fuel distribution system. A serious problem encountered with fuel oils arises from their tendency to deposit the formed sludge and foreign bodies on the screens, filters, nozzles, etc. of burners and engines using them. These deposits cause clogging of these elements which in turn necessitates cleaning and repairs. It has been found that this clogging problem can be substantially alleviated by the addition to the fuel oil of minor amounts of chemical additives known as anti-clogging agents, whihc have the ability to prevent these deposits. The products of the present invention will exhibit excellent anti-clogging action when added to fuel oils.

SCREEN ANTI-CLOGGING TEST

The test procedure involves pumping a fuel oil contaminated with 15 grams per 4 liters of a synthetic sludge composed of 10% carbon, 40% water and 50% fuel oil, through a conventional oil burner screen for two hours. The amount of deposits on the screen at the end of the test is rated on a scale of from 100 to 0, a rating of 100 indicating a perfectly clean screen and a rating of zero representing the sludge deposited by the base fuel containing no additive. The base fuel oil used in the tests comprises 60% catalytically cracked component and 40% straight-run component and has a boiling range of approximately 320° to 640° F. The results of this test are presented below:

TABLE III

| Product added | Amount added, pounds/ 1,000 bbl. | Results |
|---|---|---|
| None | 0 | 0 |
| Example 10 | 25 | 32.5 |

While the present invention has been described in considerable detail in connection with a few specific embodiments for specific purposes, it is apparent that novel compositions of this invention are not restricted to such embodiments and details for there are many obvious modifications and variations which enhance their wide application in various types of utilization. Accordingly, the present invention should not be construed as limited in any particulars except as may be recited in the appended claims or required by the prior art.

We claim:
1. A metal coordinated complex product obtained by reacting a basic organic nitrogen compound selected from the group consisting of (1) an alkylene polyamine of the formula

H$_2$N(RNH)$_z$H wherein R is alkylene of from 2 to 5 carbon atoms and z is from 1 to about 10 and (2) the product of reaction between (1) and a dicarboxylic acid or anhydride containing from 2 to about 300 carbon atoms with an aldehyde and a polyalkylphenol having a molecular weight of from about 500 to about 4000 and subsequently reacting the product thus formed with a metal-containing coordinating agent prepared from a metal selected from the group consisting of Groups I-B, II-B, IV-A, VI-B and VIII of the Periodic Table, and an acid selected from the group consisting of a mono- or dicarboxylic acid, an organic sulfonic acid, each having from 1 to about 50 carbon atoms, an organo-phosphorus-containing acid having from 1 to about 300 carbon atoms, sulfamic acid and a polyolefinic succinamic acid.

2. The product of claim 1 wherein the aldehyde contains from 1 to about 30 carbon atoms.

3. The product of claim 1 wherein the said metal is selected from the group consisting of zinc, tin and nickel.

4. The product of claim 3 wherein the metal is zinc.

5. The product of claim 1 wherein the organic nitrogen compound is diethylenetriamine.

6. The product of claim 1 wherein the organic nitrogen compound is the product of reaction between diethylenetriamine and dodecenylsuccinic anhydride.

7. The product of claim 1 wherein said nitrogen containing compound is diethylenetriamine, said aldehyde is paraformaldehyde, said polyalkylphenol is polypropylphenol having a molecular weight of about 900, and said coordinating agent is zinc acetate.

8. The product of claim 1 wherein the aldehyde is paraformaldehyde, the polyalkylphenol is polypropylphenol made from phenol and polypropylene having a molecular weight of about 825, and the coordinating agent is zinc alkyl (C$_{15}$-C$_{20}$) benzene sulfonate.

9. The product of claim 1 wherein said nitrogen-containing compound is diethylenetriamine, said aldehyde is paraformaldehyde, and said polyalkylphenol is polypropylphenol made from phenol and polypropylene having a molecular weight of about 825.

10. The product of claim 9 wherein the coordinating agent in zinc alkyl ($C_{15}$–$C_{20}$) benzene sulfonate.

11. The product of claim 9 wherein the coordinating agent is zinc polypropylphosphate.

References Cited

UNITED STATES PATENTS

| | | | |
|---|---|---|---|
| 2,353,491 | 7/1944 | Oberright | 252—51 |
| 3,173,956 | 3/1965 | Grinstead | 260—600 |
| 3,306,908 | 2/1967 | Le Suer | 260—326.3 |
| 3,365,477 | 1/1968 | Gee et al. | 260—429 |
| 3,511,780 | 5/1970 | Neblett et al. | 252—32.7 |

TOBIAS E. LEVOW, Primary Examiner

A. P. DEMERS, Assistant Examiner

U.S. Cl. X.R.

44—63, 68, 72; 252—32.5, 33, 33.6, 42.7; 260—429.3, 429.5, 429.7, 429.9, 430, 431, 435, 438.1, 438.5, 439